(12) United States Patent
Thompson

(10) Patent No.: US 7,926,392 B2
(45) Date of Patent: Apr. 19, 2011

(54) AUTOMATIC SLACK ADJUSTER TOOL

(75) Inventor: Barry Thompson, Middleburg, FL (US)

(73) Assignee: Zinstar Innovations, Inc., Jacksonville, FL (US)

( * ) Notice: Subject to any disclaimer, the term of this patent is extended or adjusted under 35 U.S.C. 154(b) by 207 days.

(21) Appl. No.: 12/261,005

(22) Filed: Oct. 29, 2008

(65) Prior Publication Data

US 2010/0101378 A1  Apr. 29, 2010

(51) Int. Cl.
*B25B 13/02* (2006.01)

(52) U.S. Cl. .......................................................... 81/119

(58) Field of Classification Search ............... 81/119, 81/488; 188/79.56, 196 R, 196 M
See application file for complete search history.

(56) References Cited

U.S. PATENT DOCUMENTS

| | | | | | |
|---|---|---|---|---|---|
| 406,538 | A | * | 7/1889 | Rickolson | 254/28 |
| 900,741 | A | * | 10/1908 | Kerr | 7/147 |
| 1,471,277 | A | * | 10/1923 | Parker | 81/119 |
| D130,756 | S | * | 12/1941 | Howard | D8/17 |
| 3,406,412 | A | * | 10/1968 | Kottas | 7/158 |
| 4,015,871 | A | * | 4/1977 | Koerbel et al. | 81/484 |
| 4,123,882 | A | * | 11/1978 | Case et al. | 52/125.5 |
| D268,473 | S | * | 4/1983 | Rust | D8/17 |
| 4,685,360 | A | * | 8/1987 | McCurdy | 81/119 |
| 7,117,766 | B1 | * | 10/2006 | Boehringer | 81/121.1 |

* cited by examiner

*Primary Examiner* — David B Thomas
(74) *Attorney, Agent, or Firm* — Mark Young, P.A.

(57) ABSTRACT

A pawl disengagement tool intended for use with a slack adjuster has an elongated handle with a first end and an opposite second end, and a longitudinal axis extending from the first end to the second end. A slotted aperture formed at the first end includes a hole with a diameter that is greater than the first diameter of the pawl cap. A first slot extends from the hole and has a width that is greater than the second diameter of the pawl shaft of the pawl assembly of the slack adjuster. A portion of the tool defining the hole includes a chamfered periphery. The chamfered periphery defines an inclined plane leading to the first slot. The inclined plane has a thickness that increases up to a thickness equal to a disengagement thickness. The disengagement thickness is effective to cause disengagement of the pawl assembly. The second end of the tool includes a forked end that includes a pair of parallel spaced apart wedge-shaped prongs. In use, the forked end or slotted aperture is manipulated (e.g., slid) to a position between the pawl cap and the body of the slack adjuster. Then the slot of the pawl disengagement means is advanced between the pawl cap and the body of the slack adjuster, until the shaft reaches the end of the slot and the tool can be advanced no further. Upon completing this step, the pawl has been disengaged and the adjustment head may be freely rotated.

7 Claims, 6 Drawing Sheets

AUTOMATIC SLACK ADJUSTER TOOL

FIELD OF THE INVENTION

This invention generally relates to brake adjusting tools, and more particularly, to a tool for disengaging the pawl of a slack adjuster of an air brake assembly.

BACKGROUND

For safety and to comply with state and federal regulations, truck drivers must regularly measure, adjust and set air brakes. In particular, slack should be checked frequently, definitely before a trip, to determine if pushrod travel is within safe-working limits. Slack adjustment entails adjusting the brakes to keep air chamber pushrod travel and brake shoe travel within tolerance to ensure the brakes are effective. Pushrod travel means the distance the pushrod extends from the air brake chamber when the brakes are applied. Brake shoes should be adjusted to move a predetermined distance before the brake pads impinge against the interior surface of a brake drum. This distance denotes the slack in the pivotal movement of the slack adjuster. Failure to maintain slack within acceptable limits may result in braking failure, such as an inability to stop, increased braking distance, or uneven braking forces causing the vehicle to yaw or roll. Only when all brakes are properly adjusted will the system be able to absorb the required amount of energy to bring the loaded vehicle to a safe stop under extreme conditions.

Figure 1:
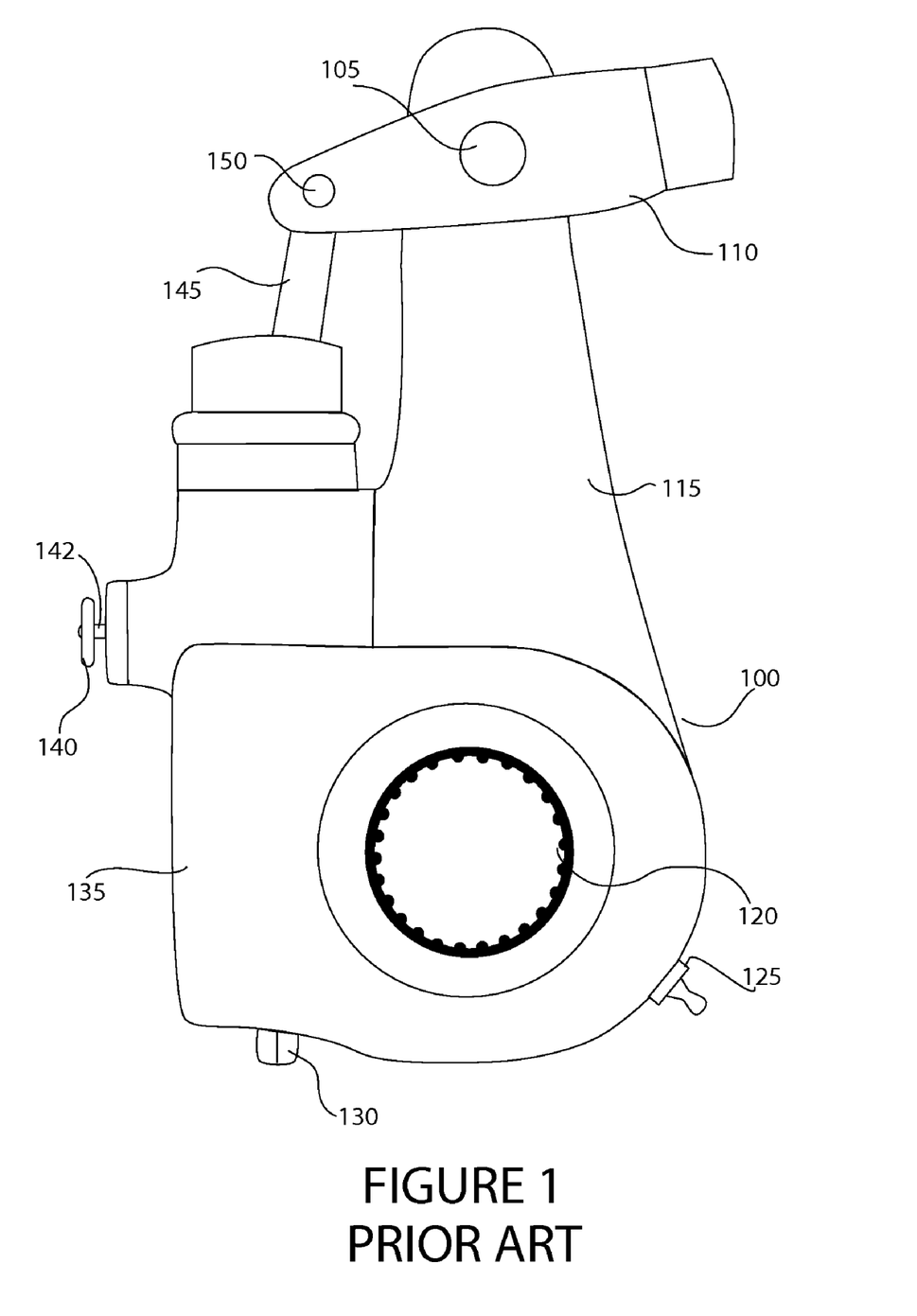
FIG. 1 shows a side view of an exemplary prior art slack adjuster.
Figure 9:
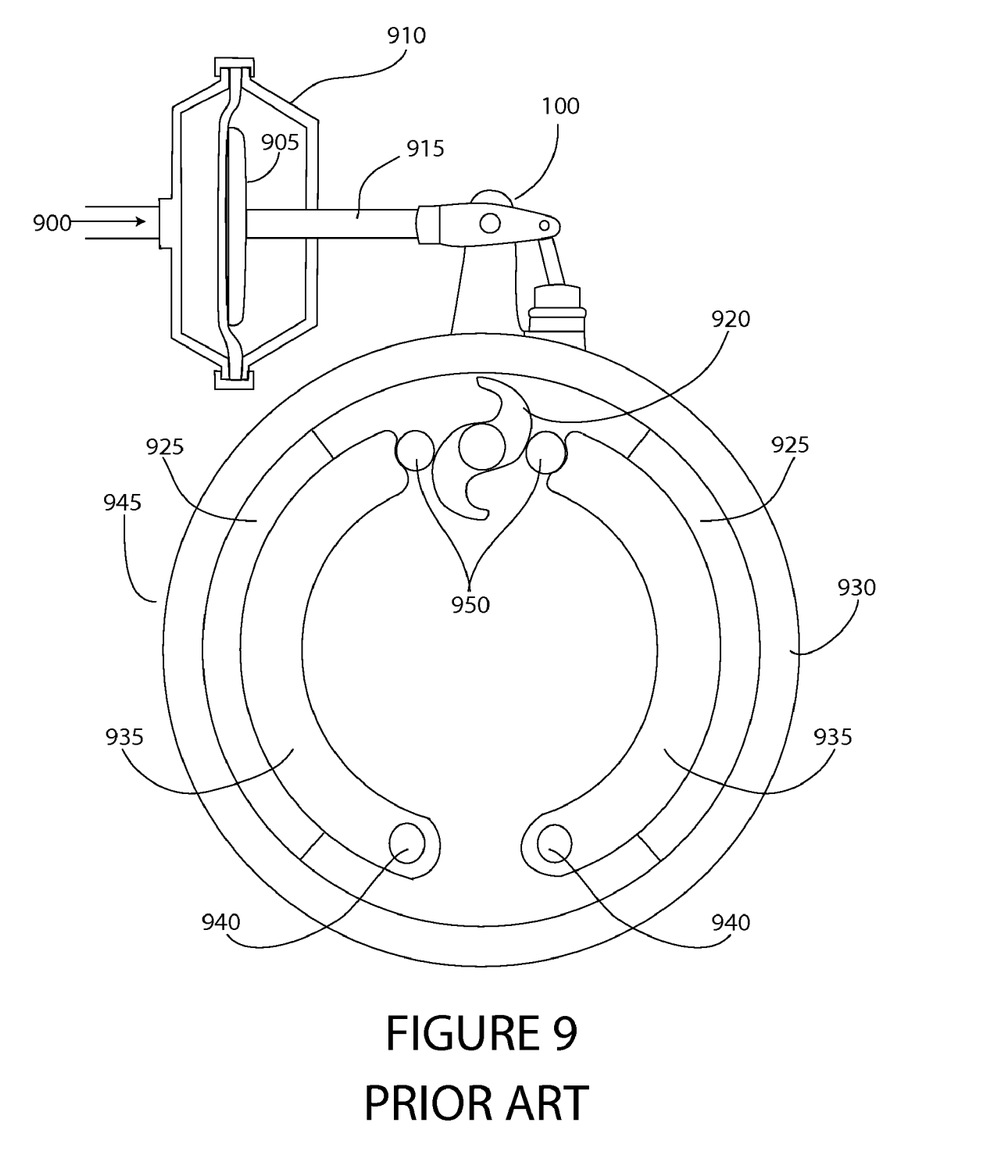
FIG. 9 is a high level schematic illustrating an exemplary prior art braking system with a slack adjuster.

With reference to FIGS. 1 and 9, a standard air brake assembly 945 used on each wheel includes an air chamber 910 with a reciprocating piston 905. A proximal end of a pushrod 915 is connected to the piston. The pushrod 915 extends outwardly from the piston 905. Pressure from compressed air in the air chamber 910 drives the piston 905. Compressed air flow 900 to the chamber 910 is controlled by a valve operated by the vehicle driver. Upon applying the brakes, the compressed air 900 causes the piston 905 and pushrod 915 to travel. A slack adjuster 100 operably coupled to the pushrod 915 transmits reciprocating motion of the pushrod into rotational motion of a cam configured to controllably urge brake shoes towards a brake drum. The slack adjuster 100 includes an arm and a base. The arm 115 of the slack adjuster 100 is connected by a clevis to a distal end of the pushrod 915. A base 135 of the slack adjuster 100 is pivotally mounted to a camshaft. Reciprocating motion of the pushrod 915 causes pivotal movement of the slack adjuster, which transmits torque through the camshaft. A cam 920, such as an S-shaped cam, is fixedly secured to the opposite end of the camshaft. Depending upon direction, rotation of the cam 920 either transmits or relieves a force through cam-follower rollers 950 that are mounted to the brake shoes 935. The brake shoes pivot about pivot pins 940. When transmitting the force, the cam urges 920 the brake shoes 935 apart towards the drum so that the brake pads 925 mounted on the shoes 935 contact the brake drum 930, thereby bringing the vehicle to a stop. When relieving the force, the brake shoes 935 retreat from the drum 930 so that the brake pads 925 mounted on the shoes 935 cease contact with the brake drum 930, thereby allowing the vehicle to move without resistance.

As the brake drum 930 and pads 925 of the brake shoes 935 wear through use, the slack adjuster 100 has to pivot a farther to apply the brakes. Thus, the range of slack adjuster 100 movement and pushrod 915 travel increase. This range of motion must be delimited so that it does not exceed a certain maximum amount. For this reason, the slack adjuster 100 includes a mechanical means for adjusting and resetting the range of its angular motion.

With reference to FIG. 1, the slack adjuster 100 is not directly mounted on the camshaft but, instead, it is rotatably mounted on a gear 120 that has internal splines that interconnect with an internal worm gear (the "worm"). The slack adjuster can rotate on the gear 120 within a limited range, thereby increasing or decreasing slack by changing the angle of the slack adjuster relative to the cam shaft. The worm rotates on an axis that is perpendicular to the axis of the camshaft. The worm has a polygonal head 130 accessible from outside the slack adjuster 100 to allow the worm to be rotated on its axis by a wrench or socket. Excess slack is taken up by rotating the head 130 to adjust the angle of the slack adjuster 100 to the appropriate position thereby causing the cam 920 to commence applying force to the cam follower rollers 950 concomitant with the movement of the pushrod 915 from the air chamber 910—the brake-on position—a short distance that is generally between ½ inches and ¾ inches from the position of the piston rod when in the brake-off position.

Many slack adjusters have a spring-loaded pawl assembly that meshes with internal teeth, locking the worm contained within the body of the slack adjuster in place. To allow rotation of the worm for adjustment, the spring-loaded pawl must be disengaged. Disengagement entails urging a pawl cap 140 away from the body 135 of slack adjuster 100 about ¼ to ¹⁄₃₂ of an inch. The terms pawl cap and cap are used herein interchangeably and denote a head structure of the pawl assembly which may be urged away from the slack adjuster 100 to cause movement of the pawl shaft 142, thereby disengaging the pawl assembly. Typically, the cap 140 is pried away from the body of the slack adjuster and held, using a screwdriver. Unfortunately, however, locating the cap 140 with a screw driver can be difficult. Additionally, an ordinary screw driver will fall from place if it is let go while prying the cap 140. Thus, the driver must dedicate one hand to holding the tool 200 and maintaining prying action.

What is needed is a reliable and easy-to-use tool for disengaging the pawl of a slack adjuster while an adjustment is made. The invention is directed to overcoming one or more of the problems and solving one or more of the needs as set forth above.

SUMMARY OF THE INVENTION

To solve one or more of the problems set forth above, an exemplary pawl disengagement tool is intended for use with a slack adjuster that includes a pawl assembly with a pawl cap having a first diameter and a pawl shaft having a second diameter. The tool includes an elongated handle having a first end and an opposite second end, and a longitudinal axis extending from the first end to the second end.

A slotted aperture is formed at the first end. The slotted aperture includes a hole formed through the tool. The hole has a diameter that is greater than the first diameter of the pawl cap of the pawl assembly of the slack adjuster. A first slot extends from the hole and has a width that is greater than the second diameter of the pawl shaft of the pawl assembly of the slack adjuster. A portion of the tool defining the hole includes a chamfered periphery. The chamfered periphery defining an inclined plane leading to the first slot. The inclined plane has a thickness that increases up to a thickness equal to a disengagement thickness. The disengagement thickness is effective to cause disengagement of the pawl assembly. The angle of the inclined plane relative to the longitudinal axis of the tool is less than 60 degrees, and preferably less than 30 degrees. The inclined planar surface providing a gradual transition to the disengagement thickness.

The second end of the tool includes a forked end that includes a pair of parallel spaced apart prongs. Each prong includes a free end. The prongs define a channel therebetween, the channel including an open end and a channel width that is greater than the second diameter of the pawl shaft and less than the first diameter of the pawl cap, and the channel also including a channel length that is greater than the second diameter of the pawl shaft and at least as great as the first diameter of the pawl cap. Each prong is wedge-shaped and having an inclined planar surface with a thickness that increases with distance from the free end, up to a thickness equal to a disengagement thickness, the disengagement thickness is effective to cause disengagement of the pawl assembly. The angle of the inclined planar surface relative to the longitudinal axis of the tool is less than 60 degrees, preferably less than 30 degrees, and the inclined planar surface providing a gradual transition between the free end and the disengagement thickness.

The preferred embodiment includes both the slotted aperture and forked prongs. Another exemplary embodiment of the tool includes the slotted aperture but not the forked prongs. Yet another exemplary embodiment includes the forked prongs but not the slotted aperture.

A method for using such a tool is also provided. The method varies slightly depending upon whether the slotted aperture or forked end is used. In each case the tool is positioned in proximity to the pawl assembly of a slack adjuster, with the pawl disengagement means (e.g., the forked end or the slotted aperture) is aimed towards the pawl shaft. Next, the pawl disengagement means is manipulated (e.g., slid) to a position between the pawl cap and the body of the slack adjuster, with the slot of the forked end or the slot of the slotted aperture aligned with the pawl shaft. Next, the slot of the pawl disengagement means is advanced between the pawl cap and the body of the slack adjuster, until the shaft reaches the end of the slot and the tool can be advanced no further. Upon completing this step, the pawl has been disengaged and the adjustment head may be freely rotated. The tool will remain in place without the user holding it. The adjustment head allows the worm contained within the slack adjuster to be rotated on its axis by a wrench or socket.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, shapes, relative sizes, ornamental aspects or proportions shown in the figures.

DETAILED DESCRIPTION

Referring to the Figures, in which like parts are indicated with the same reference numerals, various views of an exemplary slack adjuster according to principles of the invention are shown. Generally, the tool 200 includes an elongated member in the form of a depressor having a proximal closed end portion 240 and a distal forked end portion 205, identified in FIGS. 2 through 6. The tool 200 may be composed of steel, aluminum, alloys thereof or other metallic or non-metallic materials suitable for hand tool construction for example, similar to the blade of a typical screwdriver or chisel. The thickness may vary significantly without departing from the inventive concepts described herein, so long as the working ends that engage the pawl assembly of a slack adjuster are not too thick to wedge fit between the slack adjuster pawl cap 140 and body 135 of a slack adjuster 100 and are thick enough (e.g., about ⅛ inch, plus or minus 10 to 20 percent) to cause disengagement of the pawl. This thickness is referred to as the disengagement thickness because it causes disengagement of the pawl assembly. The overall length $l_3$ of the exemplary tool 200 along its major axis, from the distal to proximal end, is about 4 to 8 inches. That dimension may vary significantly without departing from the inventive concepts described herein. The overall width $w_3$ of the exemplary tool 200 along its minor axis, from side to side, is about ⅞ inches. That dimension may vary significantly, in particular it may exceed ⅞ inches, without departing from the inventive concepts described herein. The width may also vary along the length of the tool. However, the width $w_3$ must be wide enough at one end to accommodate the slotted aperture 255, which includes an opening having a diameter d (e.g., approximately ¾ inches) that is greater than the diameter of a pawl cap 140, and at the other end to accommodate the prongs 205, 210 of the forked end.

Figure 2:
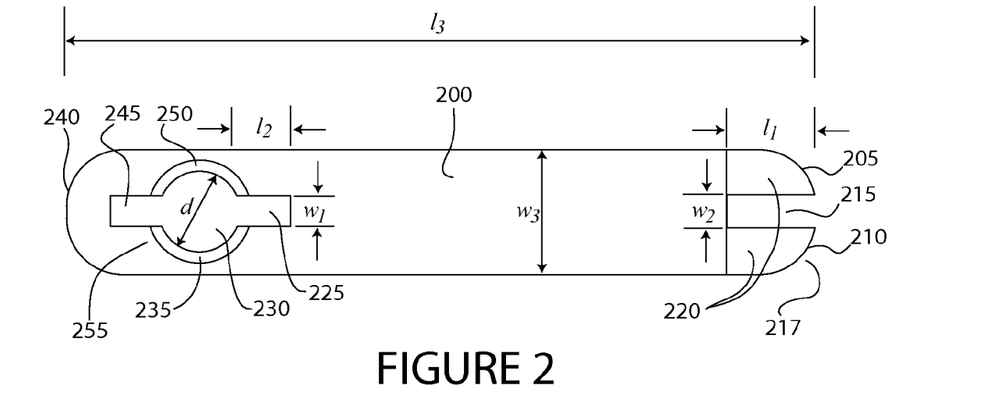
FIG. 2 shows a plan view of an exemplary slack adjuster tool according to principles of the invention.

The tool 200 includes a forked end 217 on the distal end portion of the tool 200 for the user to wedge between the pawl cap 140 and body 135 of a slack adjuster 100 for purposes of facilitating pawl disengagement. The forked end 217 is divided into two or more branches or prongs 205, 210 (i.e., bifurcated) with a space therebetween, as shown in FIG. 2. Thus, the forked end 217 includes spaced apart first and second pawl disengagement prongs 205, 210 that define a pawl-shaft-receiving channel 215 or slot extending along the central longitudinal axis of the tool 200. The first and second prongs 205, 210 are referred to as pawl disengagement prongs because they function to disengage the pawl. The prongs 205, 210 are sufficiently large in cross sectional size and rigid enough so that they do not spread or otherwise deform significantly when forced under the pawl cap 140. The width $w_2$ of the space between the prongs 205, 210 is wider than the diameter of the pawl shaft 142, but not wider than the diameter pawl cap 140. The prongs may be parallel or non-parallel, so long as the minimum space between the prongs 205, 210 is wider than the pawl shaft 142, but not wider than the pawl cap 140. The depth $l_1$ of the slot 215 is greater than the diameter of the pawl shaft 142, and preferably greater than the radius of the pawl cap 140.

Figure 3:
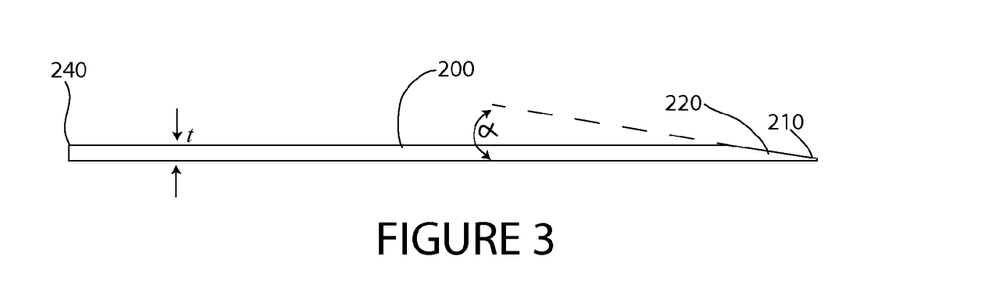
FIG. 3 shows a side view of an exemplary slack adjuster tool according to principles of the invention.

Referring to the profile view of FIG. 3, it can be seen that the prongs 205, 210 are wedge-shaped, with thickness t increasing with distance from the free end, up to a disengagement thickness. The inclined planar surfaces 220 of the prongs 205, 210 may be urged between the pawl cap 140 and body 135 of the slack adjuster 100 with the pawl shaft 142 passing between the prongs 205, 210. The disengagement thickness is sufficient to cause disengagement of the pawl assembly. Thus, as the tool 200 is advanced, the inclined planar surfaces of the wedge shaped prongs 205, 210, urges the pawl cap 140 away from the slack adjuster body 135, thereby disengaging the pawl. When the tool 200 is fully inserted and the pawl is disengaged, the retracting force of the spring biased pawl assembly will cause the pawl cap 140 to hold the tool 200 in place. While an ordinary screwdriver, which is not dimensioned to disengage a pawl assembly and engages less than half of the pawl cap 140, will fall if released by a user, a tool 200 according to principles of the invention will remain in place, acting as a shim that maintains the pawl assembly in a disengaged position until the tool 200 is removed.

As shown in FIG. 3, the angle α of the inclined planar surface is acute, and preferably less than 60 degrees, and more preferably 30 degrees or less. Thus, the angle α provides a gradual transition between the thin free end of the prongs and the disengagement thickness.

The proximal end 240 of the tool 200 includes a slotted aperture 255 configured to receive and slip over the cap 140 of the pawl assembly. The slotted aperture 255 includes a central opening 230 (e.g., a circular opening) having a diameter d (approximately ¾ inches), which is greater than the diameter of the cap 140 of the pawl assembly. The peripheral edges 235, 250 of the opening 230 are chamfered to provide a wedge-like transition to each slot 225, 245. The slotted aperture 255 includes at least one slot, and more preferably two slots 225, 245. Each slot 225, 245 defines a pawl-shaft-receiving channel with chamfered leading edges 235, 250 to facilitate disengaging the pawl. The width $w_1$ of each slot 225, 245 is wider than the diameter of the pawl shaft 142, but not wider than the diameter pawl cap 140. The prongs may be parallel or non-parallel, so long as the minimum space between the prongs 205, 210 is wider than the pawl shaft 142, but not wider than the pawl cap 140. The depth $l_2$ of each slot 225, 245 is greater than the diameter of the pawl shaft 142, and preferably greater than the radius of the pawl cap 140.

Figure 4:
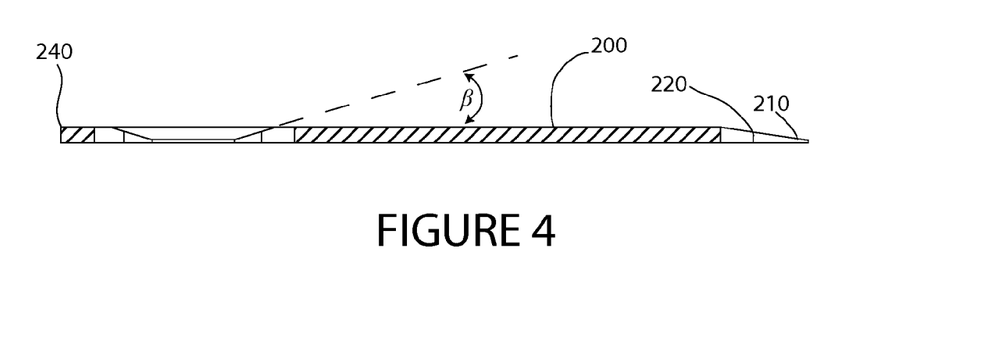
FIG. 4 shows a side section view of an exemplary slack adjuster tool according to principles of the invention.

As shown in the section view of FIG. 4, the angle β of the inclined planar surface of the chamfered peripheral edges 235, 250, is acute, and preferably less than 60 degrees, and more preferably 30 degrees or less. Thus, the angle β provides a gradual transition between the thin tips of the peripheral edges 235, 250 to the disengagement thickness of the slots 225, 245.

Figure 5:
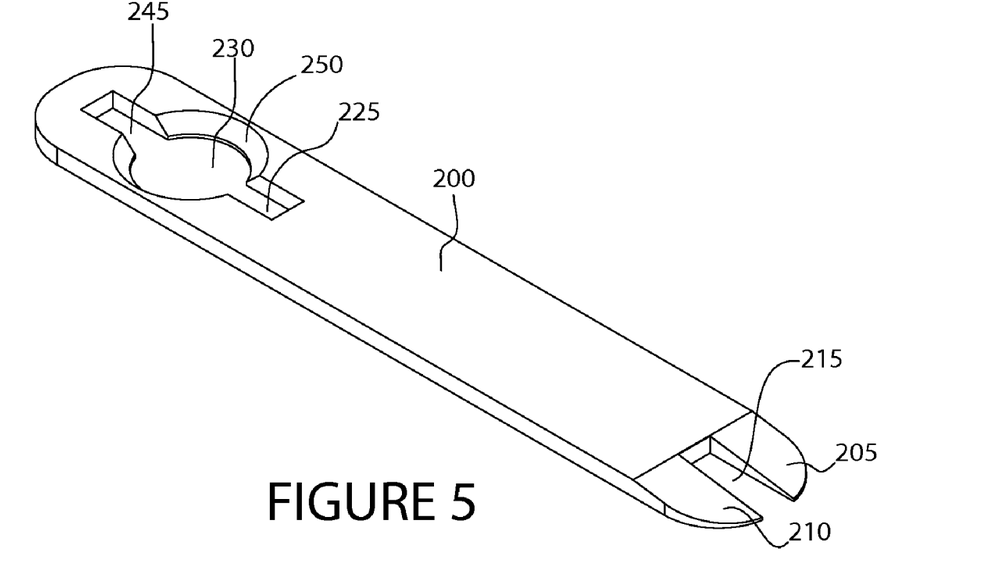
FIG. 5 shows a first perspective view of an exemplary slack adjuster tool according to principles of the invention.
Figure 6:
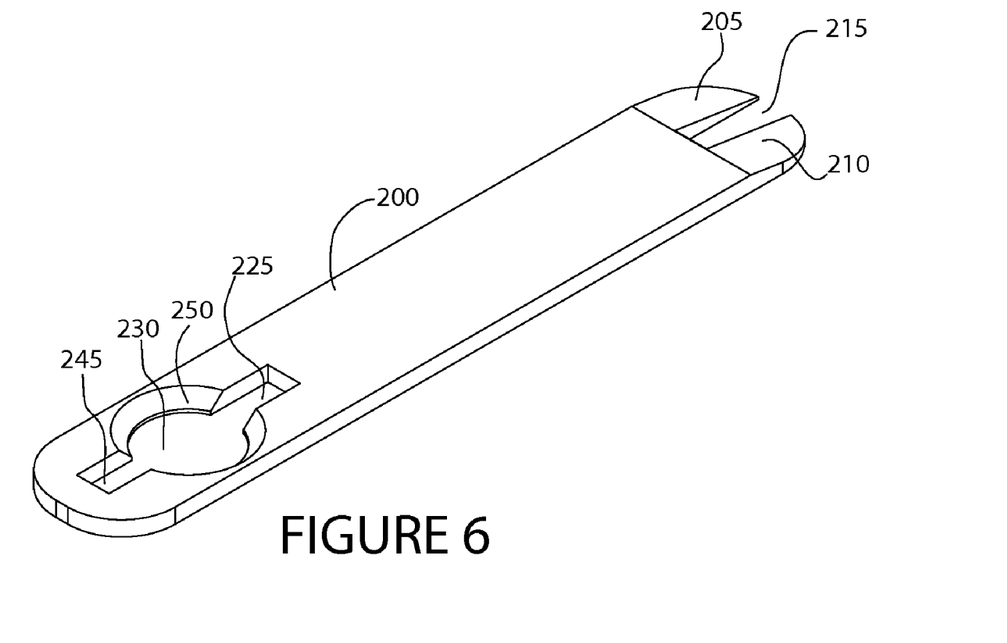
FIG. 6 shows a second perspective view of an exemplary slack adjuster tool according to principles of the invention.

Turning now to FIGS. 5 and 6, perspective views of an exemplary slack adjuster tool 200 according to principles of the invention are provided. As described above, the tool 200 provides two working ends. One end features the forked end, comprising a pair of spaced apart prongs 205, 210 defining a slot 215. The other end features the slotted aperture comprising a central opening 230 (e.g., a circular opening) having a diameter greater than the diameter of the cap 140 of the pawl assembly, chamfered peripheral edges 235, 250 of the opening 230 to provide a wedge-like transition to each slot 225, 245, and two slots 225, 245, each slot 225, 245 defining a pawl-shaft-receiving channel. Each end provides a means for disengaging the pawl of a slack adjuster. Thus, the tool provides two means for disengaging the pawl of a slack adjuster. Either means may be used to disengage the pawl of a slack adjuster in a particular circumstance. Where it is easy for a user to linearly guide the tool towards the pawl shaft 142, a user may prefer to use the forked end. Otherwise, the user may prefer to slip the slotted aperture over the pawl cap 140 to disengage the pawl.

Figure 7:
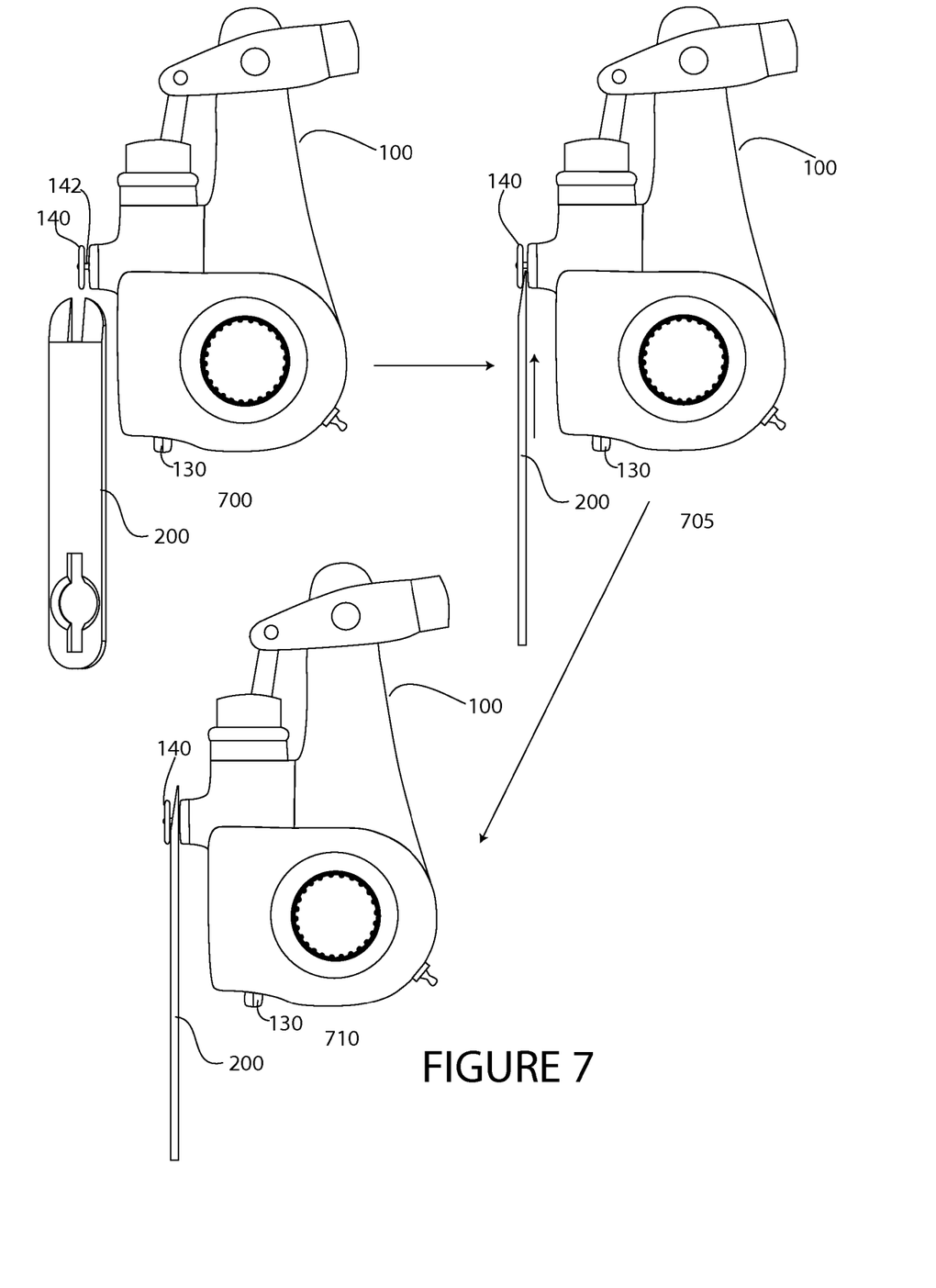
FIG. 7 is a high level flowchart conceptually illustrating an exemplary method of using an exemplary tool for adjusting a slack adjuster according to principles of the invention.

Referring now to FIG. 7, a high level flowchart conceptually illustrating an exemplary method of using the forked end of an exemplary tool for adjusting a slack adjuster according to principles of the invention is provided. In step 700, the tool 200, is positioned in proximity to the pawl assembly of a slack adjuster 100, with the forked end aimed towards the pawl shaft 142. Next in step 705, the forked end is slid between the pawl cap 140 and the body of the slack adjuster 100, with the slot of the forked end aligned with the pawl shaft 142. Next in step 710, the forked end is advanced between the pawl cap 140 and the body of the slack adjuster 100, with the slot of the forked end aligned with the pawl shaft 142, until the shaft 142 reaches the end of the slot and the tool can be advanced no further. Upon completing this step, the pawl has been disengaged and the adjustment head 130 may be freely rotated. The tool 200 will remain in place without the user holding it. The adjustment head 130 allows the worm contained within the slack adjuster to be rotated on its axis by a wrench or socket. Excess slack is taken up by rotating the head 130 to adjust the angle of the slack adjuster 100 to the appropriate position thereby causing the cam 920 to commence applying force to the cam follower rollers 950 concomitant with the movement of the pushrod 915 from the air chamber 910—the brake-on position—a short distance that is generally between ¼ inches and ¾ inches from the position of the piston rod when in the brake-off position.

Adjustment brings the shoes as close to the drums as possible, minimizing the amount of free travel when the brakes are applied. It also reduces the volume of air used to apply the brakes. Slack adjustment entails adjusting the brakes to keep air chamber pushrod travel within tolerance to ensure that the brakes are effective. Turning the adjusting head 130, when the pawl is disengaged, causes the cam 920 to rotate and urge the brake shoes against the drum. Solid resistance indicates that the brake linings have contacted the brake drum. Backing off the adjusting head 130 slightly (e.g., about ¼ or ⅓ to ½ or ¾ of a turn) should establish correct running clearance between the lining and drum.

Figure 8:
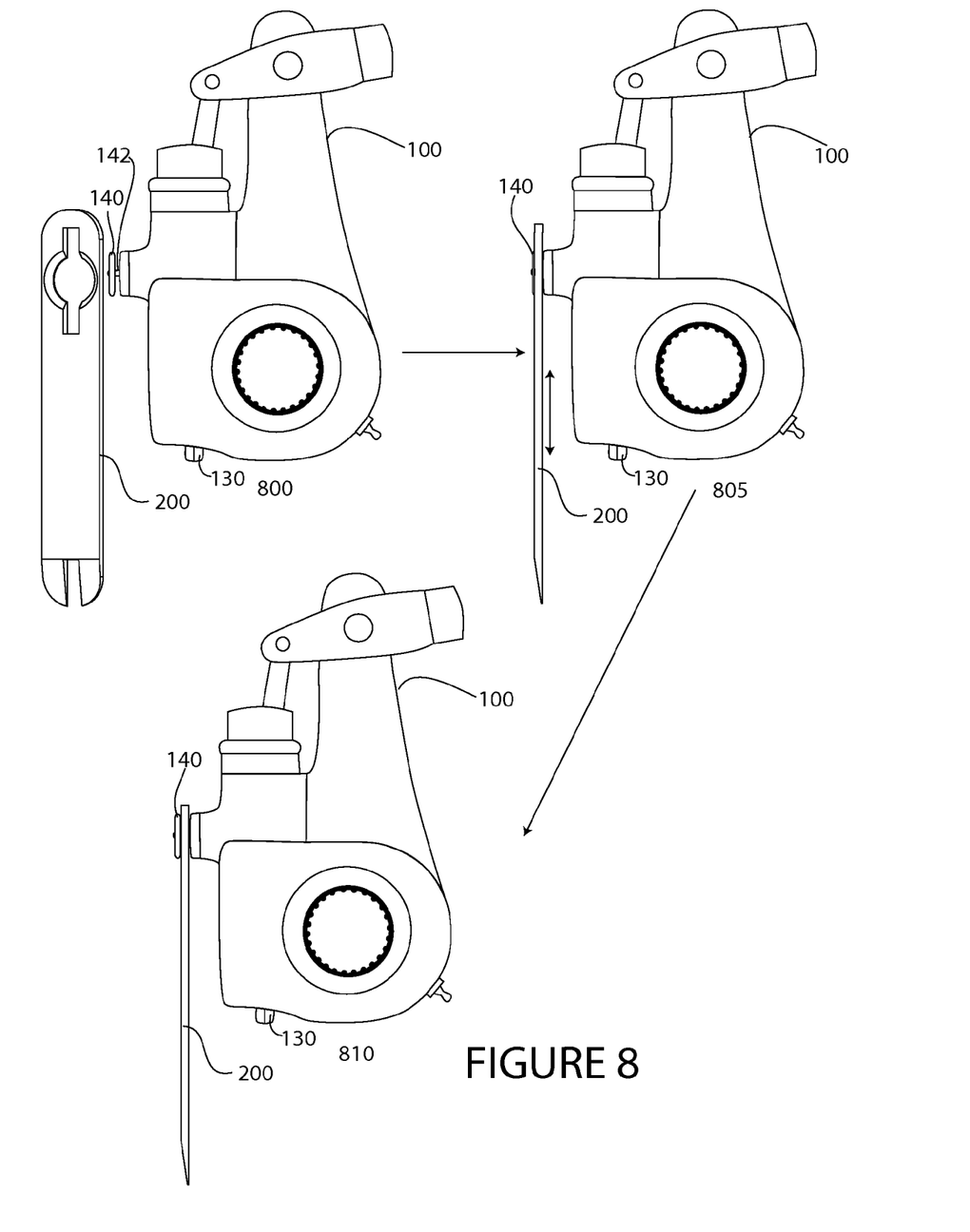
FIG. 8 is a high level flowchart conceptually illustrating another exemplary method of using an exemplary tool for adjusting a slack adjuster according to principles of the invention.

FIG. 8 is a high level flowchart conceptually illustrating another exemplary method of using an exemplary tool for adjusting a slack adjuster according to principles of the invention. In step 800, the tool 200, is positioned in proximity to the pawl assembly of a slack adjuster 100, with the slotted aperture end aimed towards the pawl cap 140. Next in step 805, the slotted aperture is slid over and receives the pawl cap 140, so that the tool is positioned between the pawl cap and the body of the slack adjuster 100. Next in step 810, the slotted aperture is advanced (e.g., pulled), towards either slot, between the pawl cap 140 and the body of the slack adjuster 100, with the slot aligned with the pawl shaft 142, until the shaft 142 reaches the end of the slot and the tool can be advanced no further. Upon completing this step, the pawl has been disengaged and the adjustment head 130 may be freely rotated. The tool 200 will remain in place without the user holding it. The adjustment head 130 allows the worm contained within the slack adjuster to be rotated on its axis by a wrench or socket. Excess slack is taken up by rotating the head 130 to adjust the angle of the slack adjuster 100 to the appropriate position thereby causing the cam 920 to commence applying force to the cam follower rollers 950 concomitant with the movement of the pushrod 915 from the air chamber 910—the brake-on position—a short distance that is generally between ¼ inches and ¾ inches from the position of the piston rod when in the brake-off position.

Adjustment brings the shoes as close to the drums as possible, minimizing the amount of free travel when the brakes are applied. It also reduces the volume of air used to apply the brakes. Slack adjustment entails adjusting the brakes to keep air chamber pushrod travel within tolerance to ensure that the brakes are effective. Turning the adjusting head 130, when the pawl is disengaged, causes the cam 920 to rotate and urge the brake shoes against the drum. Solid resistance indicates that the brake linings have contacted the brake drum. Backing off the adjusting head 130 slightly (e.g., about ¼ or ⅓ to ½ or ¾ of a turn) should establish correct running clearance between the lining and drum.

Optionally, the tool may include accessories and features. For example, instructions may be printed or engraved on the tool. A key chain hole may be provided. The central portion of the tool may be covered with an ergonomic handgrip. A light (e.g., LED) along with a battery and switch may provided and configured to controllably illuminate the slack adjuster.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A method for disengaging a pawl of a slack adjuster that includes a slack adjuster body and a pawl assembly with a pawl cap having a first diameter and a pawl shaft having a second diameter extending from the slack adjuster body, said method comprising steps of:
    providing a tool comprising an elongated handle having a first end and an opposite second end, and a longitudinal axis extending from said first end to said second end, said tool including a pawl cap engagement means from the group consisting of a slotted aperture formed at the first end and a forked end formed at the second end, wherein:
    said slotted aperture formed at the first end includes:
        a hole formed through said tool, said hole having a diameter that is greater than the first diameter of the pawl cap of the pawl assembly of the slack adjuster; and
        a first slot extending from said hole, said slot having a width that is greater than the second diameter of the pawl shaft of the pawl assembly of the slack adjuster; and
    said forked end formed at the said second end includes a pair of parallel spaced apart prongs, each prong including a free end, said prongs defining a channel therebetween, said channel including an open end and a channel width that is greater than the second diameter of the pawl shaft and less than the first diameter of the pawl cap, and said channel also including a channel length that is greater than the second diameter of the pawl shaft and at least as great as the first diameter of the pawl cap; and
    positioning the pawl cap engagement means in operative relation to the pawl cap; and
    advancing the pawl cap engagement means between the pawl cap and slack adjuster body in a manner to urge the pawl cap away from the slack adjuster body.

2. A method for disengaging a pawl of a slack adjuster according to claim 1, wherein a chamfered periphery defines said hole, said chamfered periphery further defining an inclined plane leading to the first slot, the inclined plane having a thickness that increases up to a thickness equal to a disengagement thickness, said disengagement thickness being effective to cause disengagement of the pawl assembly.

3. A method for disengaging a pawl of a slack adjuster according to claim 2, the angle of the inclined plane relative to the longitudinal axis of the tool being less than 60 degrees, and said inclined planar surface providing a gradual transition to the disengagement thickness.

4. A method for disengaging a pawl of a slack adjuster according to claim 3, wherein said second end comprises a forked end that includes a pair of parallel spaced apart prongs, each prong including a free end, said prongs defining a channel therebetween, said channel including an open end and a channel width that is greater than the second diameter of the pawl shaft and less than the first diameter of the pawl cap, and said channel also including a channel length that is greater than the second diameter of the pawl shaft and at least as great as the first diameter of the pawl cap.

5. A method for disengaging a pawl of a slack adjuster according to claim 4, each prong being wedge-shaped and having an inclined planar surface with a thickness that increases with distance from the free end, up to a thickness equal to a disengagement thickness, said disengagement thickness being effective to cause disengagement of the pawl assembly.

6. A method for disengaging a pawl of a slack adjuster according to claim 5, the angle of the inclined planar surface relative to the longitudinal axis of the tool being less than 60 degrees, and said inclined planar surface providing a gradual transition between the free end and the disengagement thickness.

7. A method for disengaging a pawl of a slack adjuster according to claim 6, the angle of the inclined planar surface relative to the longitudinal axis of the tool being less than 30 degrees, and said inclined planar surface providing a gradual transition between the free end and the disengagement thickness.

* * * * *